United States Patent
Maeda et al.

(10) Patent No.: US 6,646,574 B2
(45) Date of Patent: *Nov. 11, 2003

(54) METHOD FOR RECORDING INFORMATION, METHOD FOR REPRODUCING INFORMATION, AND INFORMATION RECORDING APPARATUS

(75) Inventors: Takeshi Maeda, Kokubunji (JP); Yukari Katayama, Chigasaki (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/193,148

(22) Filed: Jul. 12, 2002

(65) Prior Publication Data

US 2002/0186152 A1 Dec. 12, 2002

Related U.S. Application Data

(63) Continuation of application No. 09/939,553, filed on Aug. 28, 2001, now Pat. No. 6,492,915.

(30) Foreign Application Priority Data

Feb. 8, 2001 (JP) ........................................ 2001-031711

(51) Int. Cl.$^7$ ................................................ H03M 5/00
(52) U.S. Cl. ........................................... 341/58; 369/59
(58) Field of Search ............................... 341/58, 68, 69, 341/59, 95; 369/59, 13, 54

(56) References Cited

U.S. PATENT DOCUMENTS

| 4,501,000 A | | 2/1985 | Imminck et al. | |
|---|---|---|---|---|
| 5,524,103 A | * | 6/1996 | Shimizu et al. | 369/59.19 |
| 5,642,343 A | * | 6/1997 | Toda et al. | 369/47.53 |
| 5,696,505 A | | 12/1997 | Schouhamer Immink | |
| 6,014,355 A | * | 1/2000 | Bailey | 369/59.24 |
| 6,125,085 A | * | 9/2000 | Fuji et al. | 369/13.27 |

FOREIGN PATENT DOCUMENTS

JP 2000-149265 6/1999

OTHER PUBLICATIONS

Seiichi Mita, "Recent Development of Signal Processing Technology of Magnetic Disks", The Institute of Electronics, Information and Communication Engineers, Paper C–11, vol. J75–C–II, No. 11, pp. 611–623 (no date).

Etho, Mita and Doi, "Digital Video Recording Technology", published by Nikkan Kogyo Shinbun Ltd., 1990, in Japanese with summary in English, pp. 72–87.

* cited by examiner

Primary Examiner—Brian Young
Assistant Examiner—John B Nguyen

(57) ABSTRACT

A method and apparatus for recording and reproducing information to and from an optical disk. If the size of a shortest mark is made small, a signal amplitude lowers and errors are likely to occur. In order to overcome this problem, when data of asymmetric codes is written, the length of a write mark is compensated so that the shortest mark and gap have the same length.

1 Claim, 15 Drawing Sheets

FIG. 10

|  | Table A | | | | | Table B | | | | |
|---|---|---|---|---|---|---|---|---|---|---|
|  | state0 | state1 | state2 | state3 | state4 | state0 | state1 | state2 | State3 | State4 |
| 0 | 8193 | 8216 | 3073 | 3073 | 3073 | 9215 | 8216 | 7199 | 8177 | 8177 |
| 1 | 8195 | 8195 | 3075 | 3075 | 3075 | 12415 | 8195 | 3075 | 8176 | 8176 |
| 2 | 8198 | 8198 | 3078 | 3078 | 3078 | 12542 | 8198 | 3078 | 7161 | 7161 |
| 3 | 8204 | 8199 | 3079 | 3079 | 3079 | 12796 | 8199 | 6207 | 6207 | 6207 |
| 4 | 8207 | 8204 | 3084 | 3084 | 3084 | 8207 | 8204 | 3084 | 8134 | 8134 |
| 5 | 8216 | 8206 | 3086 | 3086 | 3086 | 511 | 8206 | 2040 | 2040 | 2040 |
| 6 | 8220 | 8207 | 3087 | 3087 | 3087 | 8220 | 8207 | 3087 | 3087 | 16327 |
| 7 | 8222 | 8193 | 3096 | 3096 | 3096 | 8222 | 8193 | 3096 | 8131 | 8131 |
| 8 | 8223 | 8220 | 3100 | 3100 | 3100 | 8223 | 8220 | 3100 | 3100 | 12351 |
| 9 | 8240 | 8222 | 3102 | 3102 | 3102 | 12351 | 8222 | 3102 | 3102 | 16323 |
| 10 | 8241 | 8223 | 3103 | 3103 | 12295 | 2040 | 8223 | 3103 | 3103 | 8103 |
| 11 | 8248 | 8240 | 3120 | 3120 | 3120 | 8248 | 8240 | 3120 | 8078 | 8078 |
| 12 | 8252 | 8241 | 3121 | 3121 | 3121 | 8252 | 8241 | 3121 | 3121 | 12414 |
| 13 | 8254 | 8248 | 3158 | 3158 | 3158 | 8254 | 8248 | 3128 | 3128 | 12415 |
| 14 | 8255 | 8252 | 3132 | 3132 | 3132 | 8255 | 8252 | 3132 | 3132 | 16321 |
| 15 | 8288 | 8254 | 3134 | 3134 | 12302 | 2033 | 8254 | 3134 | 3134 | 3184 |
| 16 | 8289 | 8255 | 3135 | 3135 | 12291 | 8289 | 8255 | 3135 | 3135 | 3135 |
| 17 | 8291 | 8288 | 3168 | 3168 | 3168 | 8291 | 8288 | 3168 | 8071 | 8070 |
| 18 | 8304 | 8289 | 3169 | 3169 | 3169 | 8304 | 8289 | 3169 | 3169 | 2540 |
| 19 | 8305 | 8291 | 3171 | 3171 | 3171 | 8305 | 8291 | 3171 | 3171 | 16320 |
| 20 | 8312 | 8304 | 3184 | 3184 | 3184 | 8312 | 8304 | 3184 | 3184 | 12542 |
| 21 | 8316 | 8305 | 3185 | 3185 | 3185 | 8316 | 8305 | 3185 | 3185 | 16271 |
| 22 | 8318 | 8312 | 3192 | 3192 | 3192 | 8318 | 8312 | 3192 | 3192 | 16270 |
| 23 | 769 | 8316 | 3196 | 3196 | 12316 | 8319 | 8316 | 3196 | 3196 | 3196 |
| 24 | 8384 | 8318 | 3198 | 3198 | 12294 | 2019 | 8318 | 3198 | 3198 | 3198 |
| 25 | 8385 | 8319 | 3585 | 3585 | 3585 | 8385 | 8319 | 3585 | 7966 | 7966 |
| 26 | 8387 | 8384 | 3587 | 3587 | 3587 | 8387 | 8384 | 3587 | 3587 | 12548 |
| 27 | 8390 | 8385 | 3590 | 3590 | 3590 | 8390 | 8385 | 3590 | 3590 | 12687 |
| 28 | 8391 | 8387 | 3591 | 3591 | 3591 | 8391 | 8387 | 3591 | 3591 | 16268 |
| 29 | 8416 | 8390 | 3596 | 3596 | 3596 | 8416 | 8390 | 3596 | 3596 | 12785 |
| 30 | 8417 | 8391 | 3598 | 3598 | 3598 | 8417 | 8391 | 3598 | 3598 | 16263 |
| 31 | 8419 | 8416 | 3599 | 3599 | 12337 | 8419 | 8416 | 3599 | 3599 | 3599 |
| 32 | 8432 | 8417 | 3608 | 3608 | 3608 | 8432 | 8417 | 3608 | 3608 | 2792 |
| 33 | 8433 | 8419 | 3612 | 3612 | 3612 | 8433 | 8419 | 3612 | 3612 | 3612 |
| 34 | 8440 | 8432 | 3614 | 3614 | 12344 | 8440 | 8432 | 3614 | 3614 | 3614 |
| 35 | 8444 | 8433 | 3615 | 3615 | 12300 | 8444 | 8433 | 3615 | 3615 | 3615 |
| 36 | 1537 | 8440 | 3632 | 3632 | 3632 | 8446 | 8440 | 3632 | 3632 | 12796 |
| 37 | 8577 | 8444 | 3633 | 3633 | 3633 | 8577 | 8444 | 3633 | 3633 | 3633 |
| 38 | 8579 | 8446 | 3640 | 3640 | 3640 | 8579 | 8446 | 3640 | 3640 | 3640 |
| 39 | 8582 | 8447 | 3644 | 3644 | 12385 | 8582 | 8447 | 3644 | 3644 | 3644 |
| 40 | 8583 | 8577 | 3646 | 3646 | 12312 | 8583 | 8577 | 3646 | 3646 | 3646 |
| 41 | 8588 | 8579 | 3841 | 3841 | 3841 | 8588 | 8579 | 3841 | 3841 | 14867 |
| 42 | 8590 | 8582 | 3843 | 3843 | 3843 | 8590 | 8582 | 3843 | 3843 | 3843 |
| 43 | 8591 | 8583 | 3846 | 3846 | 3846 | 8591 | 8583 | 3846 | 3846 | 3846 |
| 44 | 8640 | 8588 | 3847 | 3847 | 12400 | 8640 | 8588 | 3847 | 3847 | 3847 |

FIG. 11

|  | Table A |  |  |  |  | Table B |  |  |  |  |
|---|---|---|---|---|---|---|---|---|---|---|
|  | state0 | state1 | state2 | state3 | state4 | state0 | state1 | state2 | State3 | State4 |
| 45 | 8641 | 8590 | 3852 | 3852 | 3852 | 8641 | 8590 | 3852 | 3852 | 3852 |
| 46 | 8643 | 8591 | 3854 | 3854 | 12481 | 8643 | 8591 | 3854 | 3854 | 3854 |
| 47 | 8646 | 8640 | 3855 | 3855 | 12338 | 8646 | 8640 | 3855 | 3855 | 3855 |
| 48 | 8647 | 8641 | 3864 | 3864 | 3864 | 8647 | 8641 | 3864 | 3864 | 3864 |
| 49 | 8672 | 8643 | 3868 | 3868 | 12512 | 8672 | 8643 | 3868 | 3868 | 3868 |
| 50 | 8673 | 8646 | 3870 | 3870 | 12384 | 8673 | 8646 | 3870 | 3870 | 3870 |
| 51 | 8675 | 8647 | 3969 | 3969 | 3969 | 8675 | 8647 | 3969 | 3969 | 3969 |
| 52 | 8688 | 8672 | 3971 | 3971 | 12973 | 8688 | 8672 | 3971 | 3971 | 3971 |
| 53 | 8689 | 8673 | 3974 | 3974 | 12736 | 8689 | 8673 | 3974 | 3974 | 3974 |
| 54 | 8696 | 8675 | 3975 | 3975 | 12480 | 8696 | 8675 | 3975 | 3975 | 3975 |
| 55 | 8198 | 8688 | 3980 | 3980 | 14339 | 8700 | 8688 | 3980 | 3980 | 3980 |
| 56 | 8961 | 8689 | 3982 | 3982 | 14337 | 8961 | 8689 | 3982 | 3982 | 3982 |
| 57 | 8963 | 8696 | 4032 | 4032 | 4032 | 8963 | 8696 | 4032 | 4032 | 4032 |
| 58 | 8966 | 8700 | 4033 | 4033 | 14342 | 8966 | 8700 | 4033 | 4033 | 4033 |
| 59 | 8967 | 8703 | 4035 | 4035 | 14348 | 8967 | 8703 | 4035 | 4035 | 4035 |
| 60 | 8972 | 8961 | 4038 | 4038 | 14360 | 8972 | 8961 | 4038 | 4038 | 4038 |
| 61 | 8974 | 8963 | 4064 | 4064 | 14384 | 8974 | 8963 | 4064 | 4064 | 4064 |
| 62 | 8975 | 8966 | 4065 | 4065 | 14432 | 8975 | 8966 | 4065 | 4065 | 4065 |
| 63 | 8984 | 8967 | 4080 | 4080 | 14528 | 8984 | 8967 | 4080 | 4080 | 4080 |
| 64 | 8988 | 8972 | 113 | 96 | 96 | 8988 | 8972 | 113 | 8190 | 15920 |
| 65 | 8990 | 8974 | 120 | 97 | 97 | 8990 | 8974 | 120 | 8163 | 8163 |
| 66 | 8991 | 8975 | 99 | 99 | 99 | 8991 | 8975 | 99 | 7951 | 7951 |
| 67 | 9089 | 8984 | 387 | 112 | 112 | 9089 | 8984 | 387 | 8185 | 8185 |
| 68 | 9091 | 8988 | 96 | 113 | 113 | 9091 | 8988 | 7742 | 7742 | 7742 |
| 69 | 9094 | 8990 | 97 | 120 | 120 | 9094 | 8990 | 7711 | 7711 | 7711 |
| 70 | 9095 | 8991 | 124 | 124 | 124 | 9095 | 8991 | 124 | 124 | 12799 |
| 71 | 9100 | 9089 | 126 | 126 | 126 | 9100 | 9089 | 126 | 126 | 126 |
| 72 | 9102 | 9091 | 127 | 127 | 15361 | 9102 | 9091 | 127 | 127 | 127 |
| 73 | 9103 | 9094 | 240 | 192 | 192 | 9103 | 9094 | 240 | 8188 | 8188 |
| 74 | 9152 | 9095 | 225 | 193 | 193 | 9152 | 9095 | 225 | 8079 | 8079 |
| 75 | 9153 | 9100 | 384 | 195 | 195 | 9153 | 9100 | 7294 | 7294 | 7294 |
| 76 | 9155 | 9102 | 385 | 198 | 198 | 9155 | 9102 | 7231 | 7231 | 7231 |
| 77 | 9158 | 9103 | 199 | 199 | 199 | 9158 | 9103 | 199 | 199 | 14898 |
| 78 | 9159 | 9152 | 224 | 224 | 224 | 9159 | 9152 | 1023 | 1023 | 1023 |
| 79 | 9184 | 9153 | 193 | 225 | 225 | 9184 | 9153 | 6398 | 6398 | 6398 |
| 80 | 9185 | 9155 | 227 | 227 | 227 | 9185 | 9155 | 227 | 227 | 14899 |
| 81 | 9187 | 9158 | 192 | 240 | 240 | 9187 | 9158 | 6271 | 6271 | 6271 |
| 82 | 9200 | 9159 | 241 | 241 | 241 | 9200 | 9159 | 241 | 241 | 14460 |
| 83 | 8206 | 9184 | 248 | 248 | 248 | 9201 | 9184 | 248 | 248 | 14462 |
| 84 | 448 | 9185 | 252 | 252 | 252 | 9208 | 9185 | 252 | 252 | 252 |
| 85 | 12289 | 9187 | 254 | 254 | 12303 | 1991 | 9187 | 254 | 254 | 254 |
| 86 | 12291 | 9200 | 255 | 255 | 12818 | 12291 | 9200 | 255 | 255 | 255 |
| 87 | 12294 | 9201 | 195 | 884 | 884 | 12294 | 9201 | 195 | 8184 | 8184 |
| 88 | 12295 | 9208 | 198 | 885 | 885 | 12295 | 9208 | 198 | 7967 | 7967 |
| 89 | 12300 | 9212 | 112 | 887 | 887 | 12300 | 9212 | 2044 | 2044 | 2044 |
| 90 | 12302 | 9215 | 890 | 890 | 890 | 12302 | 9215 | 511 | 511 | 511 |

FIG. 12

|     | Table A |        |        |        |        | Table B |        |        |        |        |
|-----|---------|--------|--------|--------|--------|---------|--------|--------|--------|--------|
|     | state0  | state1 | state2 | state3 | state4 | state0  | state1 | state2 | State3 | State4 |
| 91  | 12303   | 12289  | 391    | 391    | 391    | 12303   | 12289  | 391    | 391    | 14463  |
| 92  | 12312   | 12291  | 396    | 396    | 396    | 12312   | 12291  | 4088   | 4088   | 4088   |
| 93  | 12316   | 12294  | 398    | 398    | 398    | 12316   | 12294  | 398    | 398    | 14577  |
| 94  | 12318   | 12295  | 399    | 399    | 399    | 12318   | 12295  | 399    | 399    | 399    |
| 95  | 12319   | 12300  | 448    | 448    | 448    | 12319   | 12300  | 4092   | 4092   | 4092   |
| 96  | 12336   | 12302  | 449    | 449    | 449    | 12336   | 12302  | 4081   | 4081   | 4081   |
| 97  | 12337   | 12303  | 451    | 451    | 451    | 12337   | 12303  | 451    | 451    | 14584  |
| 98  | 12344   | 12312  | 454    | 454    | 454    | 12344   | 12312  | 454    | 454    | 14588  |
| 99  | 12348   | 12316  | 455    | 455    | 455    | 12348   | 12316  | 455    | 455    | 455    |
| 100 | 12350   | 12318  | 480    | 480    | 480    | 12350   | 12318  | 4067   | 4067   | 4067   |
| 101 | 12384   | 12319  | 481    | 481    | 481    | 12384   | 12319  | 481    | 481    | 14590  |
| 102 | 12385   | 12336  | 483    | 483    | 483    | 12385   | 12336  | 483    | 483    | 483    |
| 103 | 12387   | 12337  | 496    | 496    | 496    | 12387   | 12337  | 496    | 496    | 15375  |
| 104 | 12400   | 12344  | 497    | 497    | 497    | 12400   | 12344  | 497    | 497    | 497    |
| 105 | 12401   | 12348  | 504    | 504    | 504    | 12401   | 12348  | 504    | 504    | 504    |
| 106 | 12408   | 12350  | 508    | 508    | 12348  | 12408   | 12350  | 508    | 508    | 508    |
| 107 | 12412   | 12351  | 769    | 769    | 769    | 12412   | 12351  | 7743   | 7743   | 7743   |
| 108 | 12414   | 12384  | 771    | 771    | 771    | 12414   | 12384  | 4039   | 4039   | 4039   |
| 109 | 12480   | 12385  | 774    | 774    | 774    | 12480   | 12385  | 3983   | 3983   | 3983   |
| 110 | 12481   | 12387  | 775    | 775    | 775    | 12481   | 12387  | 775    | 775    | 14591  |
| 111 | 12483   | 12400  | 780    | 780    | 780    | 12483   | 12400  | 3871   | 3871   | 3871   |
| 112 | 12486   | 12401  | 782    | 782    | 782    | 12486   | 12401  | 782    | 782    | 15390  |
| 113 | 12487   | 12408  | 783    | 783    | 783    | 12487   | 12408  | 783    | 783    | 783    |
| 114 | 12512   | 12412  | 3647   | 792    | 792    | 12512   | 12412  | 3647   | 3647   | 3647   |
| 115 | 12513   | 12414  | 796    | 796    | 796    | 12513   | 12414  | 796    | 796    | 15391  |
| 116 | 12515   | 12415  | 798    | 798    | 798    | 12515   | 12415  | 798    | 798    | 798    |
| 117 | 12528   | 12480  | 799    | 799    | 12887  | 12528   | 12480  | 799    | 799    | 799    |
| 118 | 12529   | 12481  | 3199   | 897    | 897    | 12529   | 12481  | 3199   | 3199   | 3199   |
| 119 | 12536   | 12483  | 899    | 899    | 899    | 12536   | 12483  | 899    | 899    | 15420  |
| 120 | 12540   | 12486  | 902    | 902    | 902    | 12540   | 12486  | 902    | 902    | 15422  |
| 121 | 12673   | 12487  | 903    | 903    | 903    | 12673   | 12487  | 903    | 903    | 903    |
| 122 | 12675   | 12512  | 908    | 908    | 908    | 12675   | 12512  | 908    | 908    | 15423  |
| 123 | 12676   | 12513  | 910    | 910    | 910    | 12678   | 12513  | 910    | 910    | 910    |
| 124 | 12679   | 12515  | 911    | 911    | 12401  | 12679   | 12515  | 911    | 911    | 911    |
| 125 | 12684   | 12528  | 960    | 960    | 960    | 12684   | 12528  | 960    | 8160   | 8160   |
| 126 | 12686   | 12529  | 961    | 961    | 961    | 12686   | 12529  | 961    | 961    | 15473  |
| 127 | 12736   | 12536  | 963    | 963    | 963    | 12736   | 12536  | 963    | 963    | 963    |
| 128 | 12737   | 12540  | 966    | 966    | 966    | 12737   | 12540  | 966    | 966    | 966    |
| 129 | 12739   | 12542  | 967    | 967    | 12408  | 12739   | 12542  | 967    | 967    | 967    |
| 130 | 12742   | 12543  | 992    | 992    | 992    | 12742   | 12543  | 992    | 992    | 15480  |
| 131 | 12768   | 12673  | 993    | 993    | 993    | 12768   | 12673  | 993    | 993    | 993    |
| 132 | 12769   | 12675  | 995    | 995    | 12483  | 12769   | 12675  | 995    | 995    | 995    |
| 133 | 12784   | 12678  | 1008   | 1008   | 1008   | 12784   | 12678  | 1008   | 1008   | 1008   |
| 134 | 12799   | 12679  | 1009   | 1009   | 12486  | 12799   | 12679  | 1009   | 1009   | 1009   |
| 135 | 12799   | 12684  | 1016   | 1018   | 12518  | 8703    | 12684  | 1016   | 1016   | 1016   |

FIG. 13

|  | Table A | | | | | Table B | | | | |
|---|---|---|---|---|---|---|---|---|---|---|
|  | state0 | state1 | state2 | state3 | state4 | state0 | state1 | state2 | State3 | State4 |
| 136 | 7 | 12686 | 1020 | 1020 | 12528 | 1935 | 12686 | 1020 | 1020 | 1020 |
| 137 | 12 | 12687 | 1537 | 1537 | 1537 | 12443 | 12687 | 7295 | 7295 | 7295 |
| 138 | 14 | 12736 | 1539 | 1539 | 1539 | 1823 | 12736 | 1539 | 8129 | 8129 |
| 139 | 15 | 12737 | 1542 | 1542 | 1542 | 15 | 12737 | 1542 | 8076 | 8076 |
| 140 | 24 | 12739 | 1543 | 1543 | 1543 | 1023 | 12739 | 1543 | 1543 | 15484 |
| 141 | 28 | 12742 | 1548 | 1548 | 1548 | 1598 | 12742 | 1548 | 8070 | 8070 |
| 142 | 30 | 12743 | 1550 | 1550 | 1550 | 30 | 12743 | 1550 | 1550 | 15486 |
| 143 | 31 | 12768 | 1551 | 1551 | 1551 | 31 | 12768 | 1551 | 1551 | 1551 |
| 144 | 48 | 12769 | 1560 | 1560 | 1560 | 2044 | 12769 | 1560 | 8067 | 8067 |
| 145 | 49 | 12271 | 1564 | 1564 | 1564 | 1020 | 12771 | 1564 | 1564 | 15478 |
| 146 | 50 | 12784 | 1566 | 1566 | 1566 | 255 | 12784 | 1566 | 1566 | 1566 |
| 147 | 60 | 12785 | 1567 | 1567 | 12675 | 60 | 12785 | 1567 | 1567 | 1567 |
| 148 | 62 | 12792 | 1584 | 1584 | 1584 | 62 | 12792 | 1584 | 7964 | 7964 |
| 149 | 63 | 12796 | 1585 | 1585 | 1585 | 63 | 12796 | 1585 | 1585 | 15879 |
| 150 | 96 | 12799 | 1592 | 1592 | 1592 | 8447 | 12799 | 1592 | 1592 | 15886 |
| 151 | 97 | 14337 | 1596 | 1596 | 1596 | 2792 | 14337 | 1596 | 1596 | 1596 |
| 152 | 99 | 14339 | 1598 | 1598 | 12678 | 99 | 14339 | 1598 | 1598 | 1598 |
| 153 | 112 | 14342 | 1599 | 1599 | 12684 | 12785 | 14342 | 1599 | 1599 | 1599 |
| 154 | 113 | 14343 | 6270 | 1793 | 1793 | 113 | 14343 | 6270 | 6270 | 6270 |
| 155 | 120 | 14348 | 1795 | 1795 | 1795 | 120 | 14348 | 1795 | 1795 | 15887 |
| 156 | 124 | 14350 | 1798 | 1798 | 1798 | 124 | 14350 | 1796 | 1798 | 15900 |
| 157 | 126 | 14351 | 1799 | 1799 | 1799 | 126 | 14351 | 1799 | 1799 | 1799 |
| 158 | 127 | 14360 | 1804 | 1804 | 1804 | 127 | 14360 | 1804 | 1804 | 15902 |
| 159 | 192 | 14364 | 1806 | 1806 | 1806 | 9212 | 14364 | 1806 | 1806 | 1806 |
| 160 | 193 | 14366 | 1807 | 1807 | 12737 | 12771 | 14366 | 1807 | 1807 | 1807 |
| 161 | 195 | 14367 | 1816 | 1816 | 1816 | 195 | 14367 | 1816 | 1816 | 15903 |
| 162 | 198 | 14384 | 1820 | 1820 | 1820 | 198 | 14384 | 1820 | 1820 | 1820 |
| 163 | 199 | 14385 | 1822 | 1822 | 12768 | 199 | 14385 | 1822 | 1822 | 1822 |
| 164 | 224 | 14392 | 18231 | 1823 | 14843 | 12743 | 14392 | 1823 | 1823 | 1823 |
| 165 | 225 | 14396 | 1921 | 1921 | 1921 | 225 | 14396 | 1921 | 1921 | 15921 |
| 166 | 227 | 14398 | 1923 | 1923 | 1923 | 227 | 14398 | 1923 | 1923 | 1923 |
| 167 | 240 | 14399 | 1926 | 1926 | 1926 | 240 | 14399 | 1926 | 1926 | 1926 |
| 168 | 241 | 14432 | 1927 | 1927 | 14350 | 241 | 14432 | 1927 | 1927 | 1927 |
| 169 | 248 | 14433 | 1932 | 1932 | 1932 | 248 | 14433 | 1932 | 1932 | 1932 |
| 170 | 252 | 14435 | 1934 | 1934 | 14364 | 252 | 14435 | 1934 | 1934 | 1934 |
| 171 | 254 | 14448 | 1935 | 1935 | 14385 | 254 | 14448 | 1935 | 1935 | 1935 |
| 172 | 385 | 14449 | 1984 | 1984 | 1984 | 12687 | 14449 | 1984 | 1984 | 15928 |
| 173 | 387 | 14456 | 1985 | 1985 | 1985 | 387 | 14456 | 1985 | 1985 | 1985 |
| 174 | 390 | 14460 | 1987 | 1987 | 14392 | 390 | 14460 | 1987 | 1987 | 1987 |
| 175 | 391 | 14462 | 1990 | 1990 | 14433 | 391 | 14462 | 1990 | 1990 | 1990 |
| 176 | 396 | 14463 | 1991 | 1991 | 14448 | 396 | 14463 | 1991 | 1991 | 1991 |
| 177 | 398 | 14528 | 2016 | 2016 | 2016 | 398 | 14528 | 2016 | 2016 | 2016 |
| 178 | 399 | 14529 | 2017 | 2017 | 14529 | 399 | 14529 | 2017 | 2017 | 2017 |
| 179 | 449 | 14531 | 2019 | 2019 | 4560 | 449 | 14531 | 2019 | 2019 | 2019 |
| 180 | 451 | 14534 | 2032 | 2032 | 15368 | 451 | 14534 | 2032 | 2032 | 2032 |

FIG. 14

|     | Table A | | | | | Table B | | | | |
| --- | --- | --- | --- | --- | --- | --- | --- | --- | --- | --- |
|     | state0 | state1 | state2 | state3 | state4 | state0 | state1 | state2 | State3 | State4 |
| 181 | 454 | 14535 | 2033 | 2033 | 12289 | 454 | 14535 | 2033 | 2033 | 2033 |
| 182 | 455 | 14560 | 6145 | 6145 | 6145 | 455 | 14560 | 6399 | 6399 | 6399 |
| 183 | 480 | 14561 | 6147 | 6147 | 6147 | 480 | 14561 | 6147 | 7950 | 7950 |
| 184 | 481 | 14563 | 6150 | 6150 | 6150 | 481 | 14563 | 6150 | 7943 | 7943 |
| 185 | 483 | 14576 | 6151 | 6151 | 6151 | 483 | 14576 | 6151 | 6151 | 15932 |
| 186 | 496 | 14577 | 7740 | 6156 | 6156 | 496 | 14577 | 7740 | 7740 | 7740 |
| 187 | 497 | 14584 | 6158 | 6158 | 6158 | 497 | 14584 | 6158 | 6158 | 15934 |
| 188 | 504 | 14588 | 6159 | 6159 | 6159 | 504 | 14588 | 6159 | 6159 | 6159 |
| 189 | 508 | 14590 | 7710 | 6168 | 6168 | 508 | 14590 | 7710 | 7710 | 7710 |
| 190 | 771 | 14591 | 6172 | 6172 | 6172 | 771 | 14591 | 6172 | 6172 | 15935 |
| 191 | 774 | 15361 | 6174 | 6174 | 6174 | 774 | 15361 | 6174 | 6174 | 6174 |
| 192 | 775 | 15363 | 6175 | 6175 | 15366 | 775 | 15363 | 6175 | 6175 | 6175 |
| 193 | 780 | 15366 | 7695 | 6192 | 6192 | 780 | 15366 | 7695 | 7695 | 7695 |
| 194 | 782 | 15367 | 6193 | 6193 | 6193 | 782 | 15367 | 6193 | 6193 | 16131 |
| 195 | 783 | 15372 | 6200 | 6200 | 6200 | 783 | 15372 | 6200 | 6200 | 16134 |
| 196 | 792 | 15374 | 6204 | 6204 | 6204 | 792 | 15374 | 6204 | 6204 | 6204 |
| 197 | 796 | 15375 | 6206 | 6206 | 15372 | 796 | 15375 | 6206 | 6206 | 6206 |
| 198 | 798 | 15384 | 7292 | 6240 | 6240 | 798 | 15384 | 7292 | 7292 | 7292 |
| 199 | 799 | 15388 | 6241 | 6241 | 6241 | 799 | 15388 | 6241 | 6241 | 16135 |
| 200 | 897 | 15390 | 6243 | 6243 | 6243 | 897 | 15390 | 6243 | 6243 | 6243 |
| 201 | 899 | 15391 | 6256 | 6256 | 6256 | 899 | 15391 | 6256 | 6256 | 16140 |
| 202 | 902 | 15408 | 6257 | 6257 | 6257 | 902 | 15408 | 6257 | 6257 | 6257 |
| 203 | 903 | 15409 | 6264 | 6264 | 6264 | 903 | 15409 | 6264 | 6264 | 6264 |
| 204 | 908 | 15416 | 6268 | 6268 | 15384 | 908 | 15416 | 6268 | 6268 | 6268 |
| 205 | 910 | 15420 | 7230 | 6336 | 6336 | 910 | 15420 | 7230 | 7230 | 7230 |
| 206 | 911 | 15422 | 6337 | 6337 | 6337 | 911 | 15422 | 6337 | 6337 | 16142 |
| 207 | 960 | 15423 | 6339 | 6339 | 6339 | 960 | 15423 | 6339 | 6339 | 6339 |
| 208 | 961 | 15456 | 6342 | 6342 | 6342 | 961 | 15456 | 6342 | 6342 | 6342 |
| 209 | 963 | 15457 | 6343 | 6343 | 15408 | 963 | 15457 | 6343 | 6343 | 6343 |
| 210 | 966 | 15459 | 6368 | 6368 | 6368 | 966 | 15459 | 6368 | 6368 | 16143 |
| 211 | 967 | 15472 | 6369 | 6369 | 6369 | 967 | 15472 | 6369 | 6369 | 6369 |
| 212 | 992 | 15473 | 6371 | 6371 | 15456 | 992 | 15473 | 6371 | 6371 | 6371 |
| 213 | 993 | 15480 | 6384 | 6384 | 6384 | 993 | 15480 | 6384 | 6384 | 6384 |
| 214 | 995 | 15484 | 6385 | 6385 | 15873 | 995 | 15484 | 6385 | 6385 | 6385 |
| 215 | 1008 | 15486 | 8392 | 8392 | 6392 | 1008 | 15486 | 8392 | 6392 | 6392 |
| 216 | 1009 | 15487 | 6396 | 7169 | 7169 | 1009 | 15487 | 6396 | 6396 | 6396 |
| 217 | 1016 | 15573 | 7171 | 7171 | 7171 | 1016 | 15573 | 7171 | 7199 | 7199 |
| 218 | 1539 | 15875 | 7174 | 7174 | 7174 | 1539 | 15875 | 7174 | 7174 | 16152 |
| 219 | 1542 | 15878 | 7175 | 7175 | 7175 | 1542 | 15878 | 7175 | 7175 | 7175 |
| 220 | 1543 | 15879 | 7180 | 7180 | 7180 | 1543 | 15879 | 7180 | 7180 | 16166 |
| 221 | 1548 | 15884 | 7182 | 7182 | 7182 | 1548 | 15884 | 7182 | 7182 | 7182 |
| 222 | 1550 | 15886 | 7183 | 7183 | 7183 | 1550 | 15886 | 7183 | 7183 | 7183 |
| 223 | 1551 | 15887 | 7192 | 7192 | 7192 | 1551 | 15887 | 7192 | 7192 | 16158 |
| 224 | 1560 | 15896 | 7196 | 7196 | 7196 | 1560 | 15896 | 7196 | 7196 | 7196 |
| 225 | 1564 | 15900 | 7198 | 7198 | 7198 | 1564 | 15900 | 7198 | 7198 | 7198 |

FIG. 15

|     | Table A | | | | | Table B | | | | |
| --- | --- | --- | --- | --- | --- | --- | --- | --- | --- | --- |
|     | state0 | state1 | state2 | state3 | state4 | state0 | state1 | state2 | State3 | State4 |
| 226 | 1566 | 15902 | 7216 | 7216 | 7216 | 1566 | 15902 | 7216 | 7216 | 16159 |
| 227 | 1567 | 15903 | 7217 | 7217 | 7217 | 1567 | 15903 | 7217 | 7217 | 7217 |
| 228 | 1584 | 15920 | 7224 | 7224 | 7224 | 1584 | 15920 | 7224 | 7224 | 7224 |
| 229 | 1585 | 15921 | 7228 | 7228 | 7228 | 1585 | 15921 | 7228 | 7228 | 7228 |
| 230 | 1592 | 15928 | 7264 | 7264 | 7264 | 1592 | 15928 | 7264 | 7264 | 16257 |
| 231 | 1596 | 15932 | 7265 | 7265 | 7265 | 1596 | 15932 | 7265 | 7265 | 7265 |
| 232 | 1598 | 15934 | 7267 | 7267 | 7267 | 1598 | 15934 | 7267 | 7267 | 7267 |
| 233 | 1793 | 15935 | 7280 | 7280 | 7280 | 1793 | 15935 | 7280 | 7280 | 7280 |
| 234 | 1795 | 16129 | 7281 | 7281 | 7281 | 1795 | 16129 | 7281 | 7281 | 7281 |
| 235 | 1798 | 16131 | 7288 | 7288 | 7288 | 1798 | 16131 | 7288 | 7288 | 7288 |
| 236 | 1799 | 16134 | 7681 | 7681 | 7681 | 1799 | 16134 | 7681 | 7681 | 16259 |
| 237 | 1804 | 16135 | 7683 | 7683 | 7683 | 1804 | 16135 | 7683 | 7683 | 7683 |
| 238 | 1806 | 16140 | 7686 | 7686 | 7686 | 1806 | 16140 | 7686 | 7686 | 7686 |
| 239 | 1807 | 16142 | 7687 | 7687 | 7687 | 1807 | 16142 | 7687 | 7687 | 7687 |
| 240 | 1816 | 16143 | 7692 | 7692 | 7692 | 1816 | 16143 | 7692 | 7692 | 7692 |
| 241 | 1820 | 16152 | 7694 | 7694 | 7694 | 1820 | 16152 | 7694 | 7694 | 7694 |
| 242 | 1822 | 16156 | 7704 | 7704 | 7704 | 1822 | 16156 | 7704 | 7704 | 7704 |
| 243 | 1921 | 16158 | 7708 | 7708 | 7708 | 1921 | 16158 | 7708 | 7708 | 7708 |
| 244 | 1923 | 16159 | 7728 | 7728 | 7728 | 1923 | 16159 | 7728 | 7728 | 7728 |
| 245 | 1926 | 16157 | 7729 | 7729 | 7729 | 1926 | 16257 | 7729 | 7729 | 7729 |
| 246 | 1927 | 16259 | 7736 | 7736 | 7736 | 1927 | 16259 | 7736 | 7736 | 7736 |
| 247 | 1932 | 16262 | 6336 | 7936 | 7936 | 1932 | 16262 | 6336 | 7936 | 16262 |
| 248 | 1934 | 16263 | 6240 | 7937 | 7937 | 1934 | 16263 | 6240 | 7937 | 7937 |
| 249 | 1984 | 16268 | 6192 | 7939 | 7939 | 1984 | 16268 | 6192 | 7939 | 7939 |
| 250 | 1985 | 16270 | 6188 | 7942 | 7942 | 1985 | 16270 | 6168 | 7942 | 7942 |
| 251 | 1987 | 16271 | 6156 | 7948 | 7948 | 1987 | 16271 | 6156 | 7948 | 7948 |
| 252 | 1990 | 16320 | 7169 | 7960 | 7960 | 1990 | 16320 | 7169 | 7960 | 7960 |
| 253 | 2016 | 16321 | 1793 | 8064 | 8064 | 2016 | 16321 | 1793 | 8064 | 8064 |
| 254 | 2017 | 16323 | 792 | 8065 | 8065 | 2017 | 16323 | 792 | 8065 | 8065 |
| 255 | 2032 | 16327 | 897 | 8128 | 8128 | 2032 | 16327 | 897 | 8128 | 8128 |

METHOD FOR RECORDING INFORMATION, METHOD FOR REPRODUCING INFORMATION, AND INFORMATION RECORDING APPARATUS

This application is a Continuation of nonprovisional application Serial No. 09/939,553 filed Aug. 28, 2001, now U.S. Pat. No. 6,492,915.

BACKGROUND OF THE INVENTION

The present invention relates to a method of recording and reproduction information in and from an optical disk such as a DVD, and more particularly to run-length limited codes suitable for high integration.

For a conventional optical disk drive, user data is changed to RLL (run-length limited) codes which are NRZI modulated to be converted into two-value data of "1" and "−1". This data of "1" and "−1" is assigned a mark and a non-mark which are then written in a medium.

Famous run-length limited codes for optical disks are EFM codes (U.S. Pat. No. 4,501,000) for DVD and EFM-Plus codes (U.S. Pat. No. 5,696,505) for DVD. EFM and EFMPlus codes are (d, k) RLL (run-length limited) codes where d=2 and k=10. The minimum value of the number of 0's inserted between 1 and 1 of the run-length limited codes is represented by d=2, whereas the maximum value thereof is represented by k=10. With the NRZI modulation, the sign of a run-length limited code "1" is inverted as 1→−1 and −1→1, whereas the sign of a run-length limited code "0" is remained unchanged. Therefore, d+1 is the length of a shortest mark or non-mark. Namely, the length of the shortest mark or non-mark of the EFM code or EFMPlus code is 3 bits.

Under such background, if the length d of the shortest mark is shortened, a conversion ratio m:n of user data to run-length limited codes becomes small, which broadens a detection window and is advantageous in terms of jitters. However, since the shortest mark of an optical disk is set to have a shape like a circle, as the length of the mark becomes short, the width of the mark becomes narrow. It arises therefore the problem that a signal amplitude corresponding to the minimum size of a mark becomes low in proportion to the square of the mark length. For example, if user data is written at the same density, a (1, 7) code of d=1 has a conversion ratio of 2:3 and a (2, 7) code of d=2 has a conversion ratio of 1:2. However, since (1, 7) code: (2, 7) code=8:9, the (1, 7) code is shorter by 8/9 than the (2,7) code. Since the signal amplitude is proportional to the square of the mark length, (1, 7) code: (2, 7) code=64:81 so the signal amplitude of the (1,7) code becomes about ¾ of that of the (2, 7) code. As the signal amplitude becomes small, an S/N ratio lowers so that errors are likely to occur, which poses the problem that it is impossible to lower the conversion ratio by reducing d and broaden the detection window.

SUMMARY OF THE INVENTION

In order to solve this problem, this invention provides modulation codes in which the shortest length of the mark and the shortest length of the non-mark are set asymmetrically and the length of the mark is set to 3 bits or longer.

A comparison table between modulation codes of the invention and conventional modulation codes is shown in Table 1.

TABLE 1

Comparison modulation code

| Modulation code | | (1, 7) modulation code | (2, 10) modulation code | 8–14 Asymmetric code | 8–15 Asymmetric code |
|---|---|---|---|---|---|
| User bit | n | 2 | 8 | 8 | 8 |
| Channel bit | m | 3 | 16 | 14 | 15 |
| Detection window | Tw | 2 T/3 = 0.66 T | 8 T/16 = 0.5 T | 8 T/14 = 0.571 T | 8 T/15 = 0.533 T |
|  | ns | 16 | 12 | 14 | 13 |
| Lowest frequency | fmin MHz | 3/(32 T) = 0.09375/T 3.87 | 1/(11 T) = 0.091/T 3.75 | 14/(8 * 2 * 13 T) = 0.0673/T 2.78 | 15/(8 * 2 * 16 T) = 0.0586/T 2.42 |
| Highest frequency | fmax MHz | 3/(8 T) = 0.375/T 15.5 | 1/(3 T) = 0.33/T 13.6 | 2 T:1/4 Tw, 3 T:1/6 Tw 18/12 | 2 T:1/4 Tw, 3 T:1/6 Tw 19.3/12.9 |
| Number of pattern | | 7 | 9 | ??? | ??? |
| Shortest mark length | Tmin M | 4 T/3 = 1.33 T 2 Tw | 3 T/2 = 1.5 T 3 Tw | 24 T/14 = 1.714 T 3 Tw | 24 T/15 = 1.6 T 3 Tw |
|  | ns | 32 | 36 | 42 | 39 |
| Shortest gap length | Tmin S | 4 T/3 = 1.33 T 2 Tw | 3 T/2 = 1.5 T 3 Tw | 16 T/14 = 1.14 T 2 Tw | 16 T/15 = 1.06 T 2 Tw |
|  | ns | 32 | 36 | 28 | 26 |
| Average of Shortest mark and gap | Tmin ave | 4 T/3 = 1.33 T 2 Tw | 3 T/2 = 1.5 T 3 Tw | 10 T/7 2.5 Tw | 4 T/3 2.5 Tw |
|  | ns | 32 | 36 | 35 | 32 |
| Longest mark length | Tmax | 16 T/3 = 5.33 T 8 Tw | 11 T/2 11 Tw | 104 T/14 = 7.42 T 13 Tw | 124 T/15 = 8.55 T 16 Tw |
|  | ns | 129 | 133 | 180 | 207 |
| Clock frequency | fc MHz | 3/(2 T) = 1.5 T 61.9 | 2/T 82.5 | 14/(8 T) = 1.75/T 72.2 | 15/(8 T) = 1.875/T 77.3 |

T [ns] = 24

If the user bit time T is made equal, although conventional (1,7) modulation codes have a detection window width Tw broader than (2, 10) modulation codes, there is the problem that the shortest mark length (shortest gap length) is short and a sufficient amplitude cannot be obtained. On the other hand, (2, 10) modulation codes have a shortest mark length (shortest gap length) longer than (1, 7) modulation codes, and the detection window width Tw is narrower.

Asymmetric codes of the invention have the shortest mark length longer than conventional (1, 7) and (2, 10) modulation codes and an intermediate detection window width between both modulation codes. However, since the shortest gap is shorter than (1, 7) modulation codes, modulation codes of the invention is associated with the problem that if a conventional method of directly slicing a detected waveform is used, a sufficient amplitude cannot be obtained from the shortest non-mark and the edge cannot be detected. An average interval of shortest marks (gaps) is approximately that of conventional modulation codes, as shown in Table 1. The average interval of shortest marks of asymmetric codes, particularly (8–14) asymmetric codes, is approximately that of (2, 10) modulation codes having a longest interval and the detection window width is broadened. From these reasons, the invention provides an approach to enabling to write the shortest mark shorter and the shortest gap longer and detect asymmetric codes.

FIG. 1 shows the position relation between shortest marks and gaps of a combination pattern written in a disk.

In FIG. 1, modulation codes obtained by converting n user bits into m channel bits are represented by n-m modulation codes. FIG. 1 shows the relation between a user bit interval T and each channel bit interval, by taking as examples conventional 8–16 modulation codes and 2–3 modulation codes (which are (1, 7) modulation codes presently used widely) and 8–15 asymmetric codes and 8–14 asymmetric codes. In the upper area of asymmetric codes, the layout of marks formed by writing modulation codes themselves is shown, and in the lower area, marks before write compensation are shown by broken lines and marks after write compensation are shown by solid lines. According to the invention, when data of asymmetric codes is written, all the marks are recorded shorter, for example, as shown in FIG. 1, by about 0.5 Tw in order to make the shortest marks and gaps have an equal interval. In this manner, even a combination of the shortest mark and gap forms a write mark and a write gap each having a length of 2.5 Tw. A sufficient signal amplitude for the shortest gap can be obtained similar to conventional (2, 10) modulation codes so that front and rear edges can be detected reliably. Since the detection window width is broader than conventional (2, 10) modulation codes, the reliability of data detection can be improved. As compared to conventional (1, 7) modulation codes, although the detection window width is not broader, the reproduction signal amplitudes for the shortest mark and gap are high so that the reliability of data signal detection is excellent.

A first reproduction method is to separately detect the positions of front and rear edges of a mark. With reference to FIG. 4, a read head in relative motion along a track reads an analog signal corresponding to data recorded in a track 1. A quantized signal such as indicated in (c) is obtained from the read analog signal by using a proper threshold value 4. The analog signal indicated in (b) has an amplitude, waveform and the like which are considerably changed in accordance with the read/write conditions. It is known that at least the rising part and falling part of this analog signal waveform are represented by the same form (function). It is also know that the interval of rising parts and the interval of falling parts are equal to the intervals of write data. Namely, the relation between the digitalization threshold value and the obtained digital signal is reflected upon the function of the waveform and therefore is regular. By utilizing this fact, signals corresponding to the front and rear edges of write data are separately detected. A timing signal can be reproduced from each of the detected signals and data can be reproduced by using the timing signal. By incorporating this first method into the invention, the above-described problem can be solved.

A second reproduction method is realized by using the first reproduction method and a partial response maximum likelihood (hereinafter abbreviated to PRML) modulation method. A partial response (PR) is a method of reproducing data while a necessary signal bandwidth is compressed by positively utilizing intersymbol interference (interference between reproduced signals corresponding to adjacent written bits). A Viterbi demodulation method (ML) is one kind of maximum likelihood sequence estimation and reproduces data in accordance with the information of signal amplitudes at a plurality of time instances, while a rule of intersymbol interference between reproduced waveforms is positively utilized. The details of PRML are given in "Recent Developments of Signal Processing Technology of Magnetic Disks", the Institute of Electronics, Information and Communication Engineers, Papers C-II, Vol. J75-C-II, No. 11, pp. 611–623. According to conventional PRML, since the length of the mark and gap is based upon the unit of a detection window width, the maximum likelihood sequence estimation for reproduced signals is performed at the interval of detection window widths. According to the invention, since the length of the shortest mark and gap is 2.5 times the detection window width, a conventional PRML signal process cannot be used. In this invention, therefore, the maximum likelihood sequence estimation is performed at an interval of 0.5 times the detection window width. Therefore, all marks of asymmetric codes are shortened by 0.5 times the detection window width and written so that data can be reproduced by subjecting reproduced signals from written data to the PRML process.

BRIEF DESCRIPTION OF THE DRAWINGS

FIGS. 10 shows a portion of a code conversion table according to the fourth embodiment.

FIGS. 11 to 15 are other portions of the code conversion table according to the fourth embodiment.

DESCRIPTION OF THE EMBODIMENTS (First Embodiment)

Figure 1:
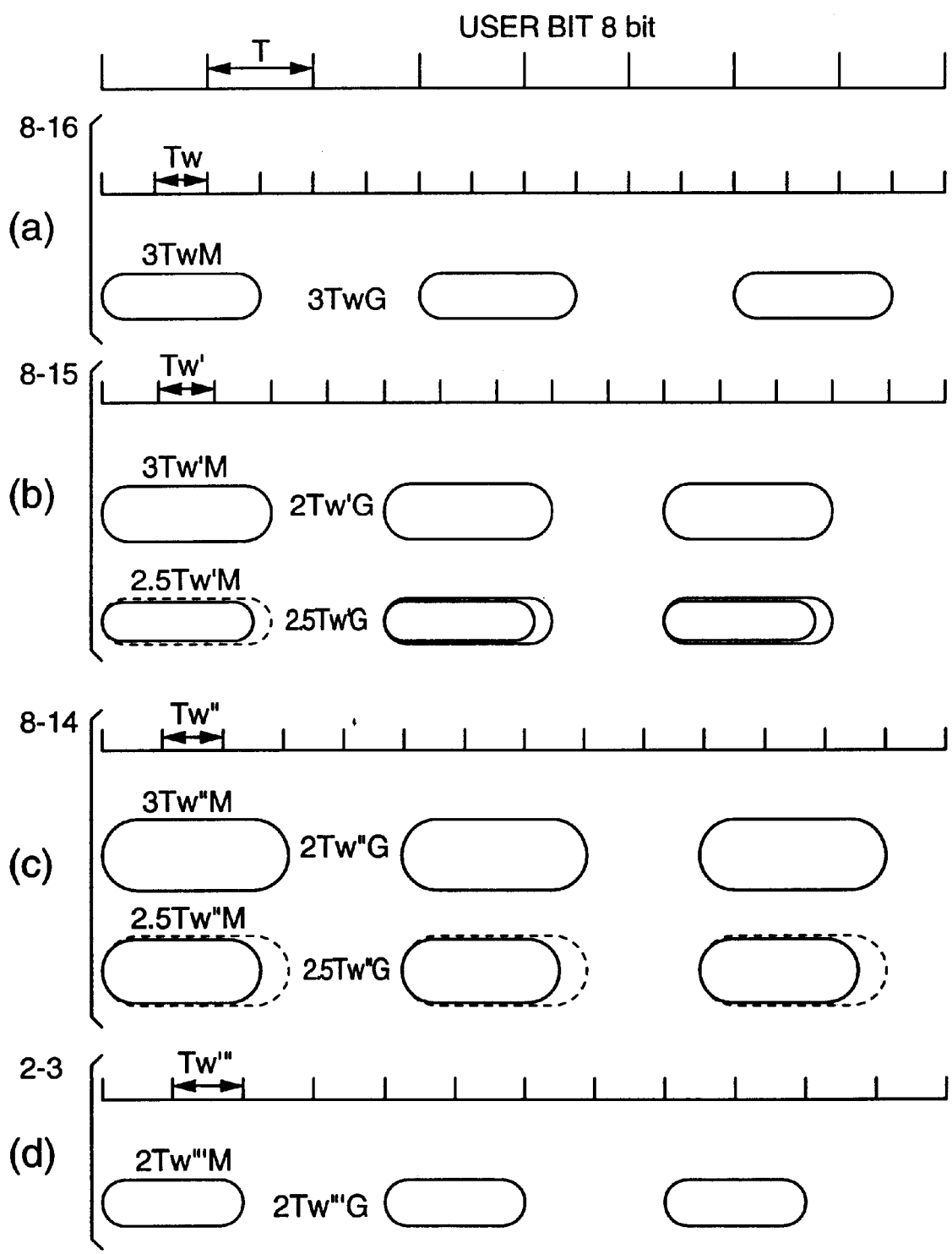
FIG. 1 is a diagram illustrating marks of modulation codes of the invention, and marks of conventional modulation codes.
Figure 2:
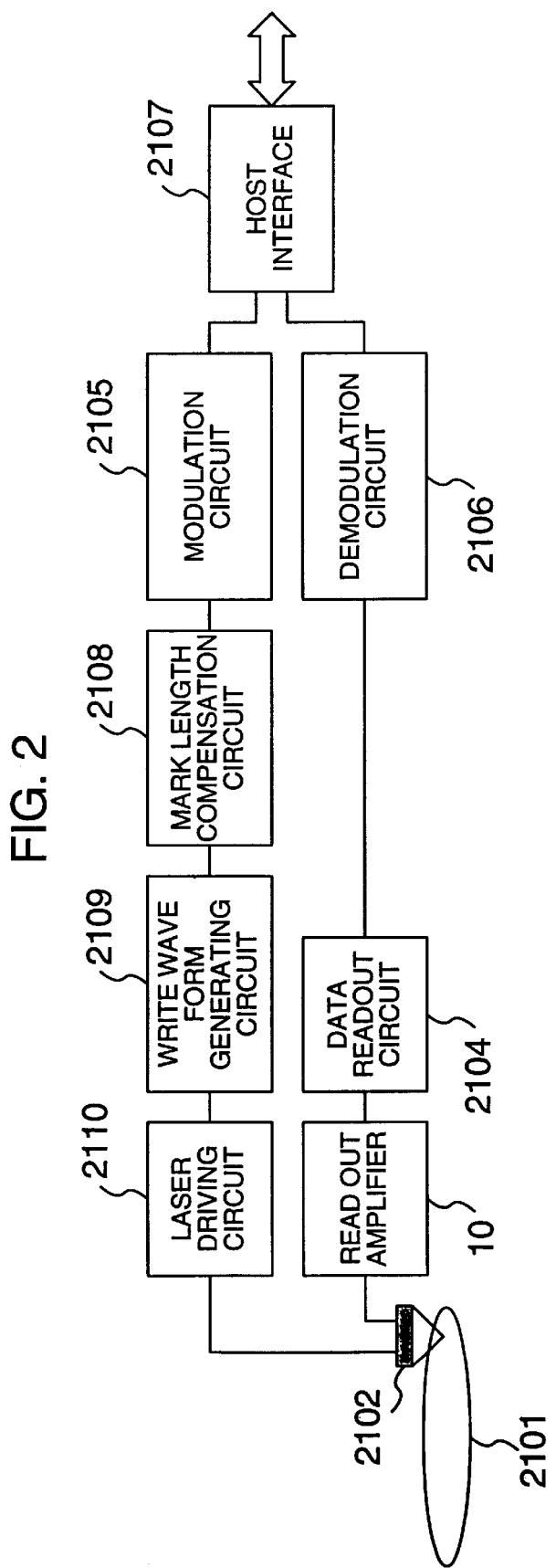
FIG. 2 is a block diagram showing a structure of an optical disk apparatus according to a first embodiment of the invention.

FIG. 2 is a block diagram showing the outline structure of an optical disk drive embodying the present invention. This embodiment is not intended to limit the scope of the invention. For example, the optical disk drive may be used as a storage medium of a computer as in this embodiment, or may be connected to a television to use the optical disk drive as a setbox audio visual recording/reproducing apparatus. Alternatively, the optical disk drive may be used as a recording/reproducing apparatus such as a handy video camera and a portable music reproducing apparatus.

Referring to FIG. 2, a host interface (host I/F) 2107 controls data transfer between the optical disk drive and an unrepresented host computer such as a personal computer. A modulation circuit 2105 modulates write user data supplied from the host computer via the host I/F 2107 into asymmetric codes in accordance with a predetermined rule, the user data being converted into the asymmetric codes capable of being recorded in a recording medium 2101 (this process is called coding). The converted data capable of being written in the recording medium is called channel data. A mark length compensation circuit 2108 receives the coded data in the NRZ (non-return to zero) format from the modulating circuit 2105, shortens the pulse length corresponding to the mark length by a half of the detection window width, and sends the data in the NRZ format to a write waveform generating circuit 2109. In this case, although the pulse length corresponding to the mark length is shortened, the pulse length corresponding to the space length is not shortened. The write waveform generating circuit 2109 converts the waveform of the data into a voltage waveform suitable for the recording medium. For example, as disclosed in JP-A-2000-149265, for rewritable phase change media, a waveform corresponding to the write data pattern is generated by using a multi-pulse controlled timings. A laser driving circuit 2110 converts the received write waveform into a laser driving current and sends this current to a read/write head 2102 to control the irradiated light power of a semiconductor laser and write a mark in the recording medium. In reading data, the read/write head 2102 applies a laser beam to the recording medium, reads data from reflected light by utilizing a reflection intensity difference between marks and non-marks, and converts the read data into electrical data. After the electrical data is amplified properly at a readout amplifier 10, it is output to a data readout circuit 2104. The data readout circuit 2104 performs a proper bandwidth limit of the read signal and thereafter converts the signal into a digital signal.

A demodulation circuit 2106 demodulates the supplied digital data sequence in the manner opposite to the modulation circuit 2105 (this process is called decoding) to recover the original data. The optical disk drive reads/writes data in the above-described processes.

(Second Embodiment)

Figure 3:
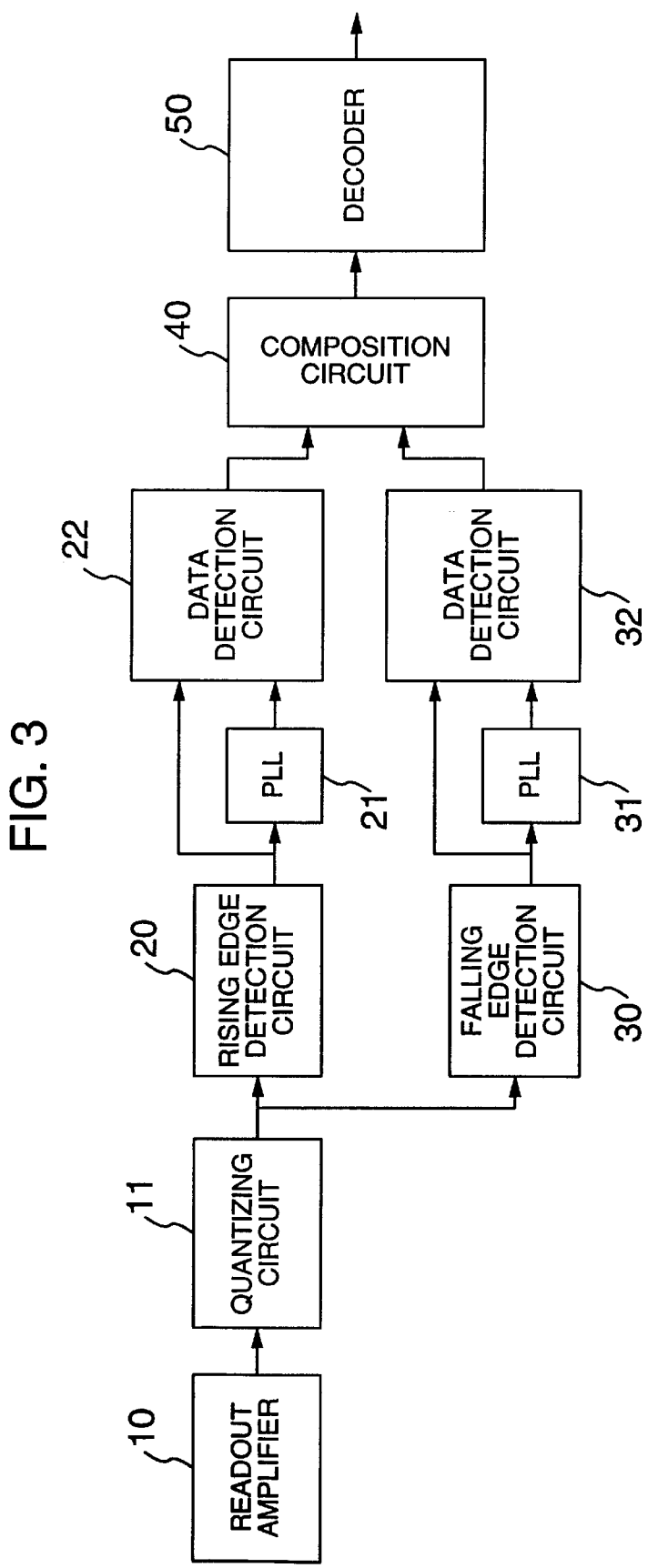
FIG. 3 is a block diagram showing a second embodiment of the invention.
Figure 4:
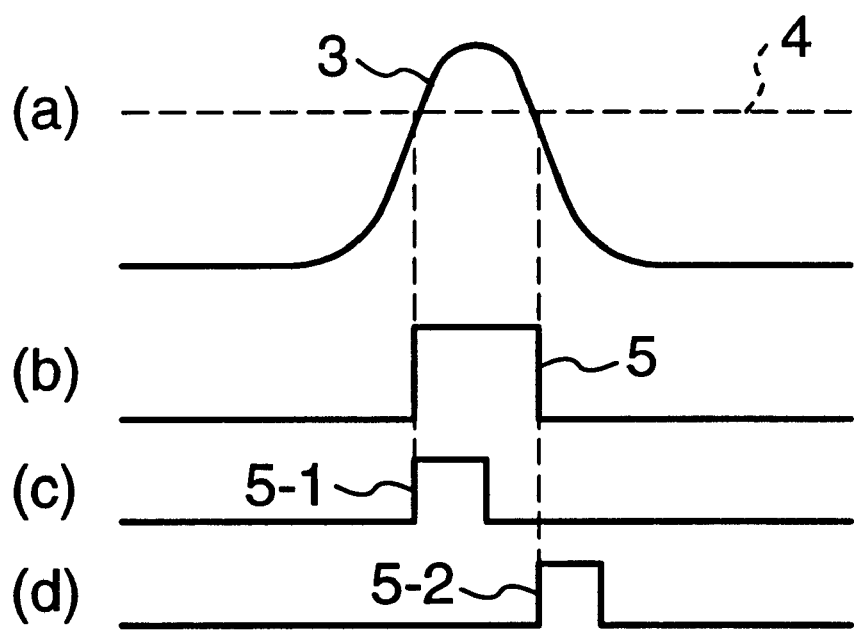
FIG. 4 is a set of diagrams illustrating the operation of the second embodiment shown in FIG. 3.

The first reproduction method will be detailed in the following. FIG. 3 is a block diagram showing the structure of a data readout circuit embodying the present invention. A readout amplifier 10 outputs an analog signal waveform 3 shown in FIG. 4(*a*) corresponding to data written in a recording medium (e.g., a pit written in an optical disk). A quantizing circuit 11 outputs a quantized pulse 5 shown in FIG. 4(*b*) by using a threshold value 4 and the analog signal waveform 3 shown in FIG. 4(*a*). A rising edge detection circuit 20 outputs a pulse 5-1 (FIG. 4(*c*)) corresponding to the rising part of the quantized pulse 5, and a falling edge detection circuit 30 outputs a pulse 5-2 (FIG. 4(*d*)) corresponding to the falling part of the quantized pulse 5. In FIGS. 4(*c*) and 4(*d*), reference numeral 5-1 represents the pulse corresponding to the rising edge of the quantized pulse 5, and reference numeral 5-2 represents the pulse corresponding to the falling edge of the quantized pulse 5. These pulses are called edges pulses or data pulses. Reference numeral 21 and 31 represent timing reproducing circuits which are, for example, PLL (Phase Locked Loop) circuits. Namely, consecutive clocks corresponding to the rising and falling timings of the quantized pulse 5 are reproduced from the outputs of the rising edge detection circuit 20 and falling edge detection circuit 30. Data detection circuits 22 and 32 judge at each clock timing reproduced by the PLL circuits 21 and 31 whether the data pulse exists. Namely, the circuit 20 judges at the clock generated from the rising edge pulse whether the data pulse corresponding to the rising edge exists, and the circuit 32 performs a similar operation relative to the falling edge. A composition circuit 40 composes the process results of the two edge pulses. This composition circuit 40 may be a register which inputs the process results at respective clocks and outputs the result at one of the two clocks or at a third clock. A decoder 50 demodulates the data sequence into original data. This decoder 50 is not specific to this invention, but may be a decoder similar to a conventional apparatus.

Figure 5:
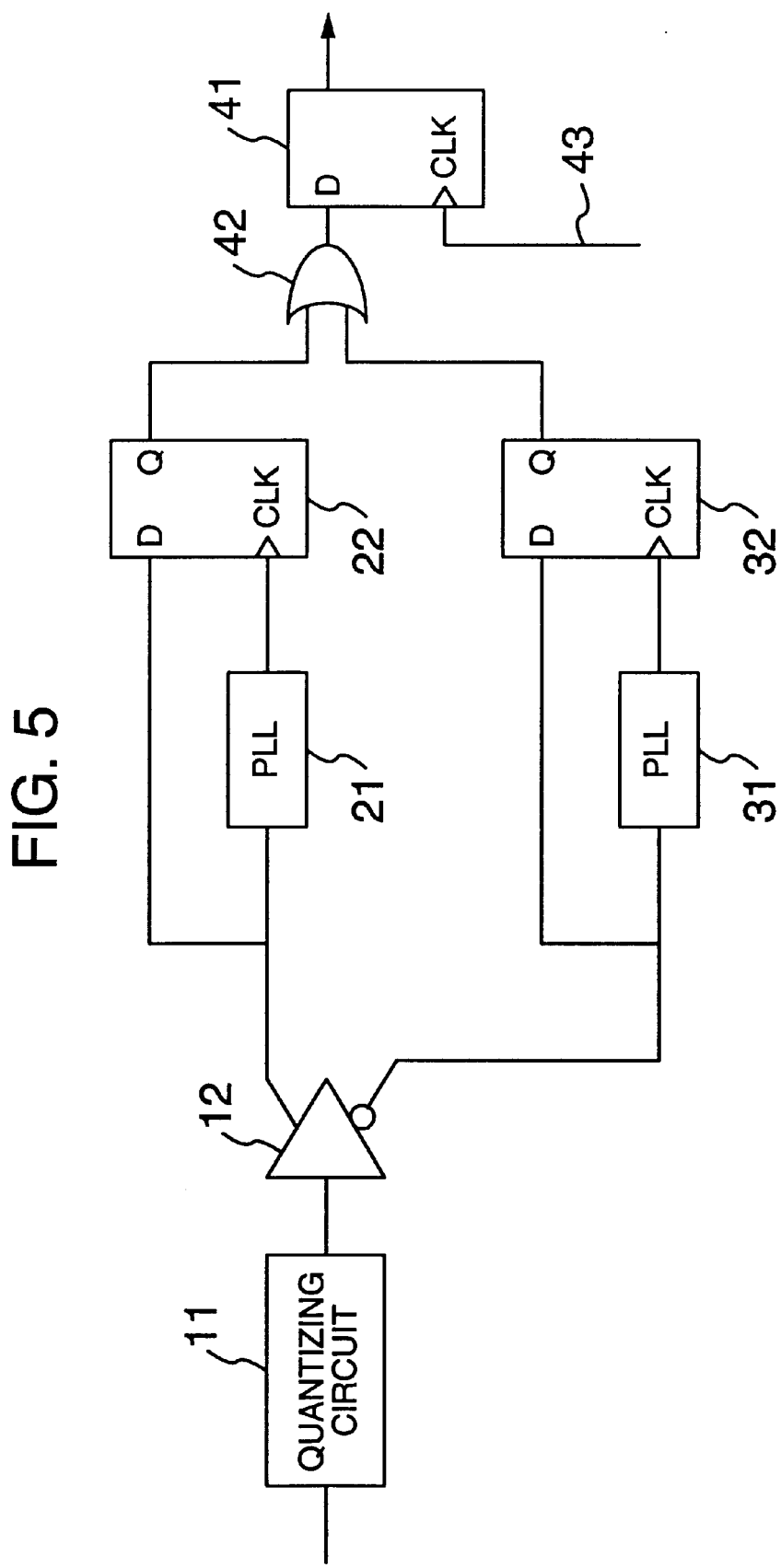
FIG. 5 is a block diagram showing a specific circuit of the second embodiment shown in FIG. 3.

FIG. 5 shows an example of a specific circuit of processing the rising edge pulse 5-1 or falling edge pulse 5-2. Reference numeral 12 represents a gate having positive and complementary two outputs, reference numerals 22 and 32 represent flip-flops, reference numeral 42 represents an OR gate, reference numeral 41 represents a register, and reference numeral 43 represents a clock signal. According to the third embodiment described above with reference to FIG. 3, the rising and falling edge pulses are independently processed and quantized data is composed. Therefore, even if a mark is written shorter in a disk, modulation data of asymmetric codes can be demodulated by decoding the composed data.

(Third Embodiment)

Figure 6:
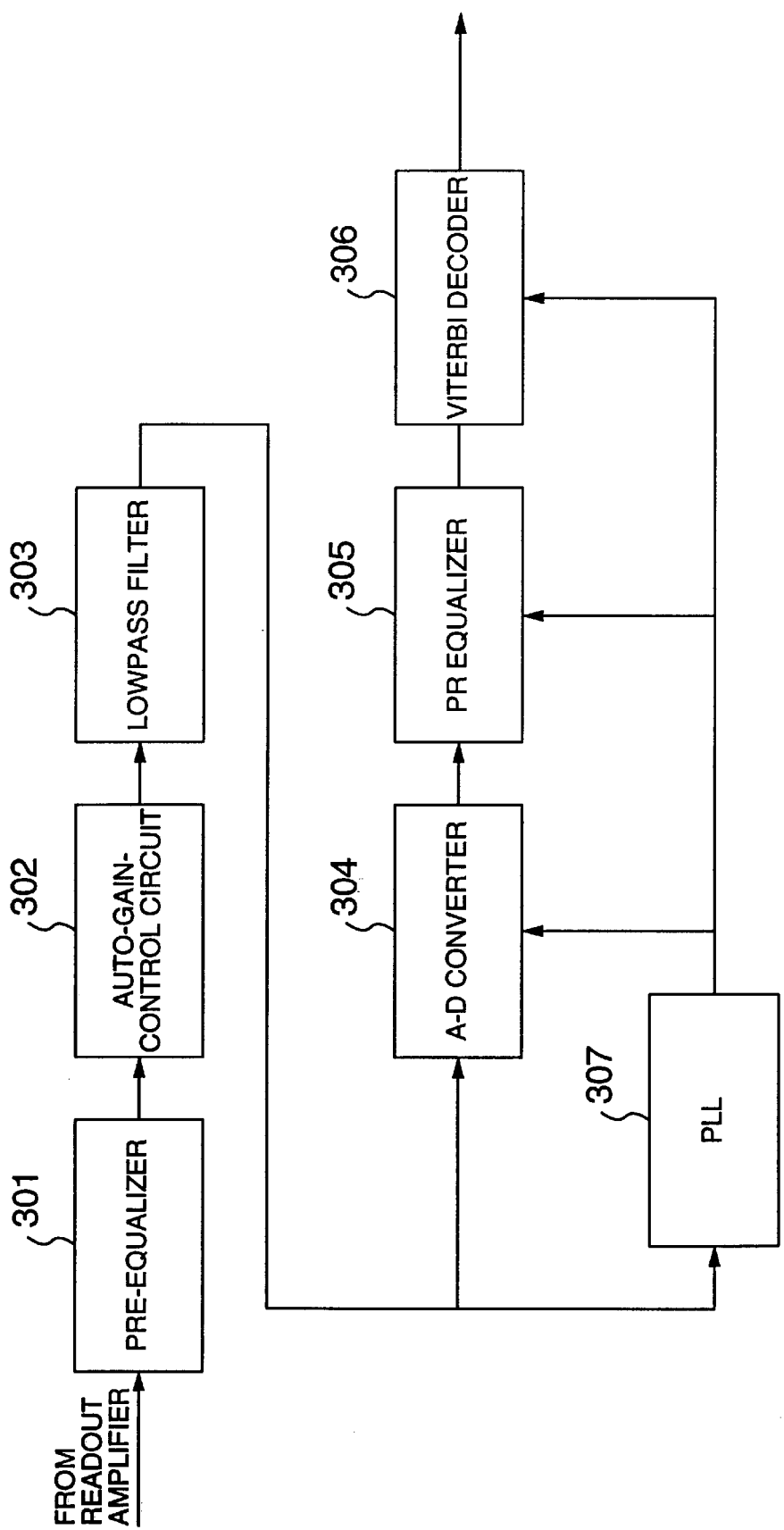
FIG. 6 is a block diagram showing a third embodiment of the invention.

The second reproduction method will be detailed with reference to FIG. 6. A disk readout signal output from the readout amplifier 10 is supplied to a pre-equalizer 301 in the form of an analog signal. The pre-equalizer 301 uses a transversal filter and changes the waveform of the readout signal to a waveform which allows a PLL circuit to generate a clock to be described later. An output signal from the pre-equalizer 301 is input to an auto-gain-control circuit 302 which controls its gain to obtain a constant output signal amplitude so that Viterbi decoding to be described later can be performed. An output signal from the auto-gain-control circuit 302 is input to a lowpass filter 303 to limit the bandwidths of noises and signals. An output of the lowpass filter is input to an A–D converter 304 and a PLL circuit 307. An A–D converted digital signal is input to a PR equalizer 305 which uses a digital filter having characteristics providing predetermined partial response characteristics together with the equalizing characteristics of the pre-equalizer. An output of the PR equalizer 305 is input to a Viterbi decoder 306 to perform a Viterbi decoding process. The Viterbi signal processing performs the following operation. For the details thereof, refer to "Digital Video Recording Technology" by Etho, Mita, and Doi, published by the Nikkan Kogyo Shinbun Ltd., 1990. If there is a correlation between data, an ideal reproduction waveform draws only limited patterns. An actual reproduction waveform which contains noises may depart from these patterns. However, by selecting a pattern most nearest to these patterns, a most likelihood data sequence can be found. Waveforms equalized by using the PR (partial response) method can be Viterbi decoded because data is made to have a correlation by intersymbol interference. If there is no noise in the read out waveform, the signal yn that the waveform after PR signal processing is sampled at the timing n is determined only by intersymbol interference from the data before timing n and the waveform from the object data an to be reproduced. The interference can be expressed by the combination of interference from data at other timing except timing n. This is defined as a state Sn. The possible state of Sn is limited. Therefore, the state transition can be represented by Sn, an and yn. An actually sampled data is compared with all combinations (yn, an) estimated at each timing of the state transition, and the pass of the combination (yn, an) having a most nearest value is left. By repeating this operation at each timing, only one pass is eventually left. An an sequence of this pass is a most likelihood data sequence. The sampling timing of this process is determined by clocks generated by the PLL circuit.

(Fourth Embodiment)

A run-length code configuration method and a modulation circuit will be described in detail in which the shortest length of the mark is 3 bits and the shortest length of the non-mark is 2 bits.

In this embodiment, a coder will be described which generates codes having the minimum number of bits of the mark of 3 bits and the minimum number of bits of the non-mark of 2 bits and has a function of suppressing DC components of a code. This modulation circuit is structured so that 0 of the output code sequence is a mark and 1 is a non-mark.

Figure 7:
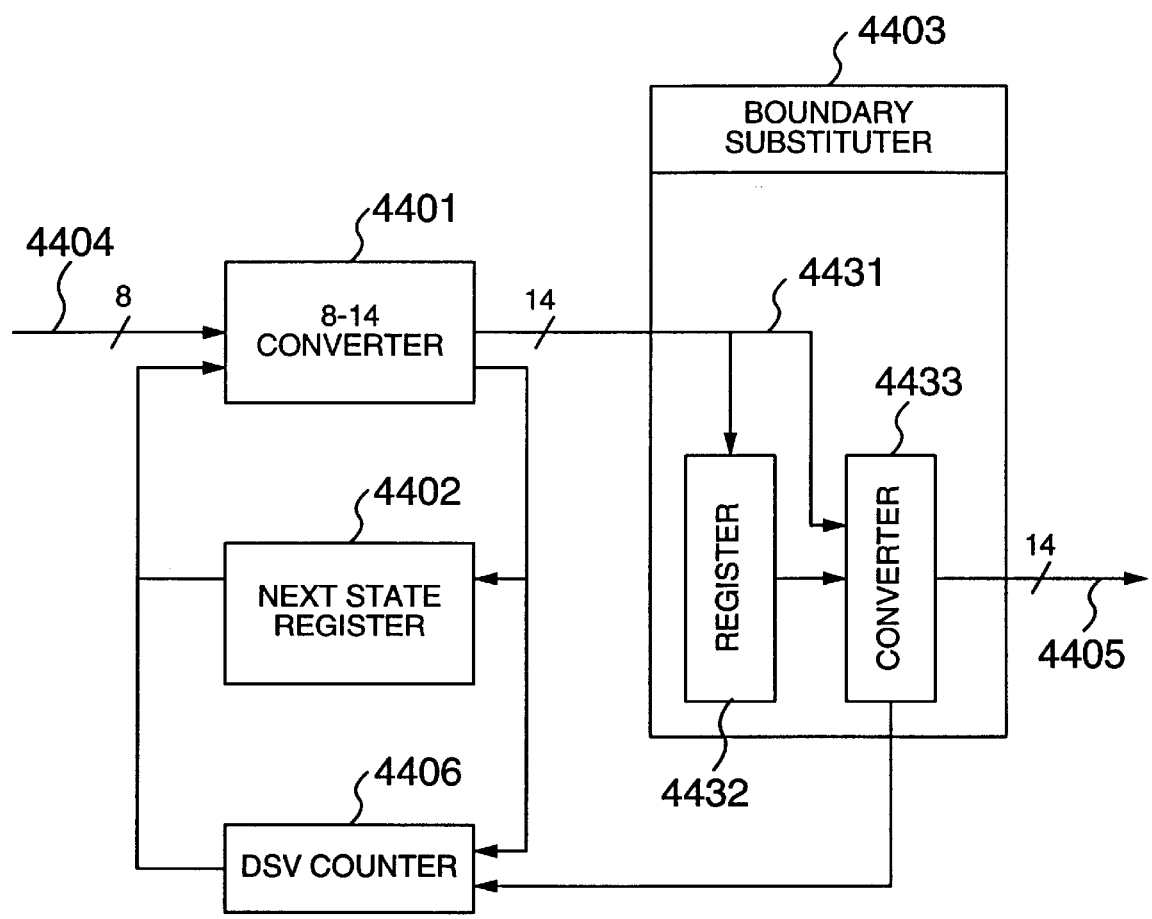
FIG. 7 is a block diagram showing a modulation circuit according to a fourth embodiment of the invention.

FIG. 7 is a block diagram showing the details of the modulation circuit 2105. User data is sent from the host I/F via a signal line 4404. A next state register 4402 and a DSV counter 4406 are initialized to "0" in the initial state. Conversion by the tables shown in FIGS. 10 to 15 is performed by using the values in the next stage register 4402 and DSV counter 4406 and user data supplied from the signal line 4404. If the value of the DSV counter 4406 is positive, conversion is performed by using tables A shown in FIGS. 10 to 15, whereas if the value of the DSV counter 4406 is 0 or negative, conversion is performed by using tables B shown in FIGS. 10 to 15. The tables A shown in FIGS. 10 to 15 each have five left columns, and the tables B each have right five columns. In these tables, each code word is represented by a decimal value. In the tables A and B, different code words are used in the shaded areas, and the same code words are used in the areas other than the shaded areas. The shaded area of the table A is constituted of only code words each having 14 bits and having the much smaller number of 1's than 0's, i.e., only code words having five or less 1's. The shaded area of the table B is constituted of only code words each having 14 bits and having the smaller number of 1's than 0's, i.e., only code words having eight or more 1's. Therefore, if the code in the shaded area is selected for the running digital sum (RDS) with the mark of "−1" and the non-mark of "1", low frequency components can be controlled.

In the next state register, the state to be used for the next conversion is set as in the following. If the last two bits of an output code sequence of an 8-14 converter 4401 are "11", then the state in the next state register 4402 is set to "0". If the last two bits of an output code sequence of the 8-14 converter 4401 are "01", then the state is set to "1". If the last two bits of an output code sequence of the 8-14 converter 4401 are "10", then the state is set to "2". If the last three bits of an output code sequence of the 8-14 converter 4401 are "100", then the state is set to "3". If the last three bits of an output code sequence of the 8-14 converter 4401 are "000", then the state is set to "4".

In accordance with the output code sequence of the 8-14 converter 4401, the DSV counter 4406 adds (the number of 1's)×1+(the number of 0's)×(−1)+2 to a DSV count.

In the tables shown in FIGS. 10 to 15, if the previous code sequence is an output code sequence of the state "0" having the last two bits of "11", code sequences having the first three bits of "100", "110" or "000" and satisfying the above constrain (two bits of "1" always continue and three bits of "0" always continue) are assigned uniquely to each user data. If the previous code sequence is an output code sequence of the state "1" having the last two bits of "01", code sequences having the first three bits of "100", "110", or "111" and satisfying the above constrain (two bits of "1" always continue and three bits of "0" always continue) are assigned uniquely to each user data. If the previous code sequence is an output code sequence of the state "2" having the last three bits of "100", code sequences having the first three bits of "000", "001" or "011" and satisfying the above constrain (two bits of "1" always continue and three bits of "0" always continue) are assigned uniquely to each user data. If the previous code sequence is an output code sequence of the state "2" having the three bits of "000", code sequences having the first three bits of "000", "001" or "011" and satisfying the above constrain (two bits of "1" always continue and three bits of "0" always continue) are assigned uniquely to each user data. If the previous code sequence is an output code sequence of the state "2" having the last two bits of "10", code sequences having the first three bits of "000", "001" or "011" and satisfying the above constrain (two bits of "1" always continue and three bits of "0" always continue) are assigned uniquely to each user data.

With the above conversions, if the previous output code sequence has the last two bits of "10" and the succeeding output code sequence has the first three bits of "011", then the above constrain (two bits of "1" always continue and three bits of "0" always continue) is not satisfied. Therefore, if the previous output code sequence has the last two bits of "10" and the succeeding output code sequence has the first three bits of "011", a boundary substituter 4403 converts these five bits into "11" and "111".

The boundary substituter 4403 operates as in the following. The boundary substituter 4403 checks the first three bits of an output code sequence supplied from the 8-14 converter 4401 via a signal line 4431 and the last two bits of an output code sequence before one step loaded in a register 4432. If the first three bits of the output code sequence supplied from the 8-14 converter 4401 are not "011" or if the last two bits of the output code sequence before one step registered in the register 4432 are not "10", then a converter 4433 outputs the output code sequence before one step loaded in the register 4432 to the mark length compensation circuit 2108 as an modulation circuit output. The output code sequence from the 8-14 converter 4401 is loaded in the register 4432. If the first three bits of the output code sequence supplied from the 8-14 converter 4401 are "011" and if the last two bits of the output code sequence before one step registered in the register 4432 are "10", the last two bits of the output code sequence before one step loaded in the register 4432 are converted from "10" into "11" and this converted code sequence is output to the mark length compensation circuit 2108. The first three bits of the output code sequence from the 8-14 converter 4401 are converted from "011" into "111", and this converted code sequence is loaded in the register 4432. Since the succeeding code sequence having the state "1" with the last two bits of "11" does not contain a code sequence having the first three bits of "111", with the above-described conversion the code sequence output from this modulation circuit 2105 has the code word satisfying the above constrain and the user data can be uniquely converted.

With the above-described conversion, the code sequence output from this modulation circuit 2105 has the code word satisfying the above constrain and the user data can be uniquely converted. Further, DSV is checked at each step and the table to be used is selected. The table A used for a positive DSV has as many code words as possible which have the number of 0's larger than the number of 1's added by +2. The table B used for the 0 or negative DSV has as many code words as possible which have the number of 1's added by +2 larger than the number of 0's. Therefore, the DC components of a code word can be controlled.

Figure 8:
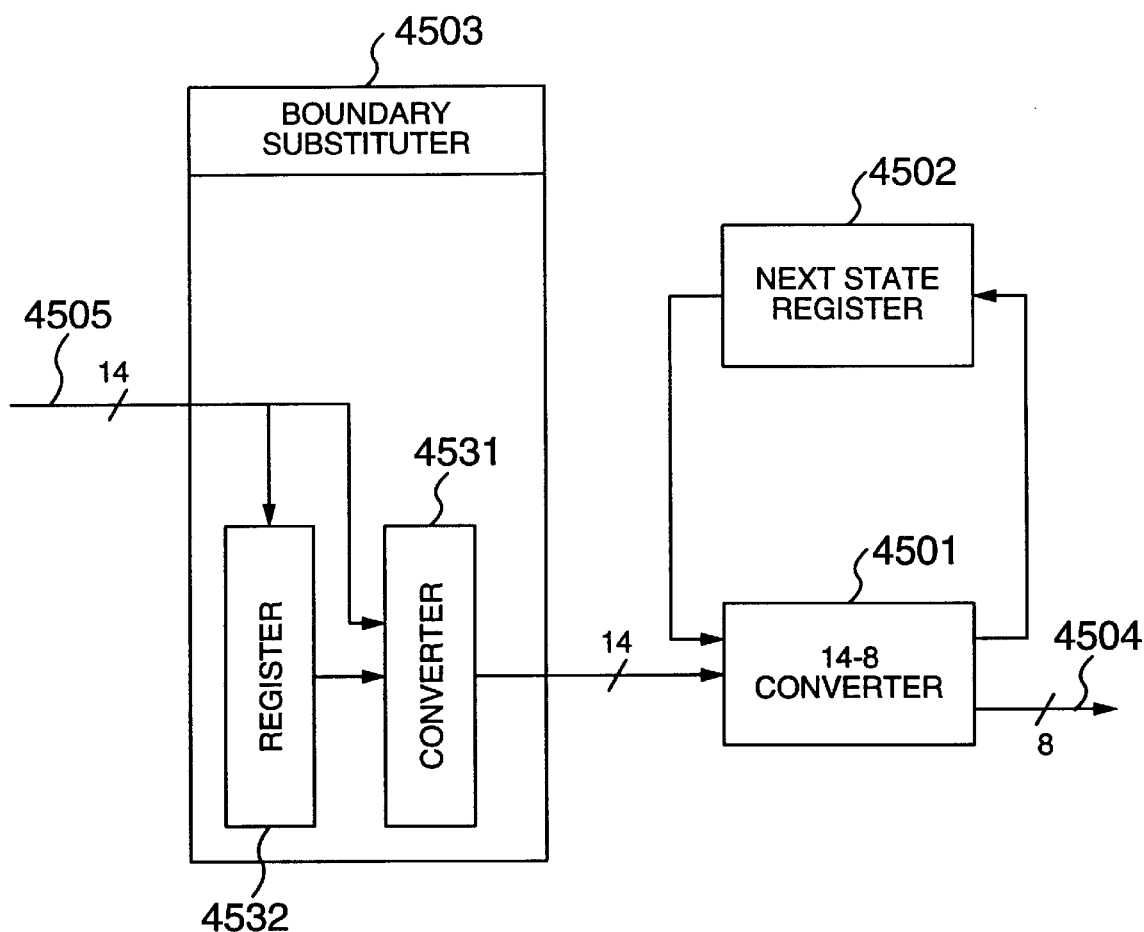
FIG. 8 is a block diagram showing a demodulation circuit of according to the fourth embodiment.

FIG. 8 is a block diagram showing the details of the demodulation circuit 2106 of this embodiment. A data sequence of 14 bits each reproduced by the data readout circuit 2104 as "0" for the mark and "1" for the non-mark is input to the demodulation circuit.

As the data is input to a boundary substituter 4503 via a signal line 4505, a converter 4531 outputs the output code sequence before one step loaded in a register 4532 to a 14-8 converter 4501 by converting the last two bits of the code sequence into "10", if the last two bits of the output code sequence before one step loaded in the register 4532 are "11" and if the first three bits of the code sequence input from the signal line 4505 are "111". The first three bits of the code sequence input from the signal line 4505 are converted into "011" and this converted code sequence is loaded in the register 4532. If the first three bits of the input data are not "111" and the last two bits of the code sequence loaded in the register 4532 are not "11", then the code sequence loaded in the register 4532 is output to the 14-8 converter 4501, and the input code sequence is loaded in the register 4532.

The 14-8 converter 4501 performs the reverse conversion of the 8-14 converter 4401. A next state register 4502 is initialized to "0" in the initial state. As 14-bit data is input, user data is output to a signal line 4504 in accordance with the state of the tables shown in FIGS. 10 to 15 and the 14-bit data.

Similar to the modulation circuit 4405, the next state register 4502 is set to "0" if the last two bits of the input 14-bit code sequence are "11", to "1" if the last two bits of the input 14-bit code sequence are "01", to "2" if the last two bits are "10", to "3" if the last three bits of the input 14-bit code sequence are "100", and to "4" if the last three bits are "000". With these conversions, user data can be demodulated. In the tables A and B shown in FIGS. 10 to 15, the duplicated code words are assigned to the same user data, and there are no duplicated code words in each state. It is therefore possible to uniquely decode the user data.

Figure 9:
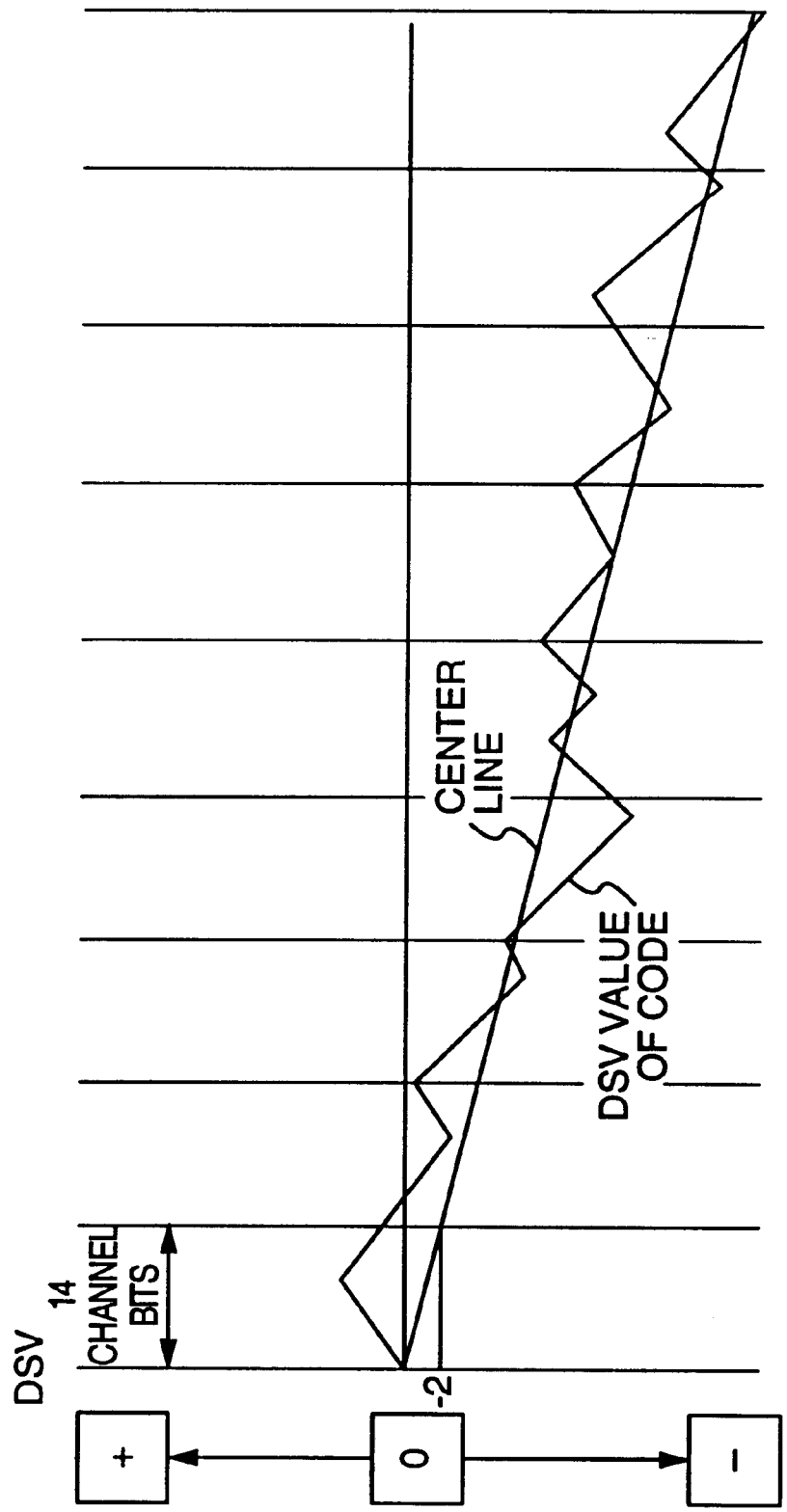
FIG. 9 is a diagram illustrating a DSV value according to the fourth embodiment.

The DSV counter adds 2 to the actual DSV value at each conversion. If the DSV counter value is 0 or smaller, the table B is selected which is constituted of codes having the number of 1's added by +2 relatively larger than the number of 0's, whereas if the DSV counter value is larger than 0, the table A is selected which is constituted of codes having the number of 1's added by +2 relatively smaller than the number of 0's. Therefore, as shown in FIG. 9, the actual DSV value of a code is controlled around a line reducing by −2 per 14 channel bits.

As described so far, according to the invention, in a data read apparatus in which signals corresponding to the front and rear edges (rising edge and falling edge) are detected from a signal read from data written in a recording medium and data is read by a self-clocking method (clocks for data read are reproduced from write data itself), both the signals are separately processed. Therefore, even if the mark shorter than the mark length determined from asymmetric codes is written and the gap is written longer, the data read is possible. If asymmetric codes are applied to an optical disk drive, a high density data read/write system can be realized.

The following contents are also disclosed.

An information recording and reproducing method for recording information by writing marks on a medium with a laser beam and for reproducing information from a reproduction signal corresponding to an intensity of light reflected from the mark, wherein:

first channel data corresponding to a write waveform for forming a shortest mark and second channel data corresponding to a write waveform for forming a shortest gap between marks are asymmetric;

channel data including the first and second channel data is converted into a write waveform of the laser beam, and written in the medium in such a manner that the intervals of shortest marks and shortest gaps become approximately equal; and first and second timing signals corresponding to rising and falling edges of a reproduction signal are detected from the reproduction signal corresponding to an intensity of light reflected from the mark, first and second synchronous signals and clock signals are formed separately from the first and second timing signals, and data is reproduced separately from the first and second timing signals obtained from the mark in accordance with the first and second synchronous signals and clock signals to compose the separately reproduced data for demodulation.

In the information recording and reproducing method above, preferably, 8–14 codes are used as modulation codes for converting user bits into channel bits when information is recorded.

What is claimed is:

1. An information recording apparatus, comprising:

a laser driven circuit for driving a laser to be applied to a recording medium;

a modulation circuit for modulating user data into channel data, wherein a first channel data corresponding to a write waveform for forming a shortest mark and second channel data corresponding to a write waveform for forming a shortest gap between mark are asymmetric;

a mark length compensation circuit for shortening a pulse length corresponding to a shortest mark length of data of an NRZ format supplied from said modulation circuit by a half of a detection window width; and a write waveform generating circuit for converting data supplied from said mark length compensation circuit into a voltage waveform.

* * * * *